United States Patent [19]

Ohta et al.

[11] Patent Number: 4,626,284
[45] Date of Patent: Dec. 2, 1986

[54] RECORDING LIQUID

[75] Inventors: Tokuya Ohta; Masatsune Kobayashi, both of Tokyo; Konoe Miura; Hiroshi Takimoto, both of Yokohama, all of Japan

[73] Assignees: Mitsubishi Chemical Industries Ltd.; Canon Inc., both of Tokyo, Japan

[21] Appl. No.: 656,730

[22] Filed: Oct. 1, 1984

[30] Foreign Application Priority Data

Oct. 8, 1983 [JP] Japan ................................. 58-188653
Nov. 17, 1983 [JP] Japan ................................. 58-216664

[51] Int. Cl.⁴ .......................................... C09D 11/02
[52] U.S. Cl. ..................................................... 106/22
[58] Field of Search ........................................ 106/22

[56] References Cited

U.S. PATENT DOCUMENTS 4,197,135  4/1980  Bailey et al. ........................ 106/23

OTHER PUBLICATIONS

Lepri, L. and P. G. Desideri, J. of Chromatography, 161 (1978), 279–286.

Primary Examiner—Amelia B. Yarbrough
Attorney, Agent, or Firm—Fitzpatrick, Cella, Harper & Scinto

[57] ABSTRACT

The recording liquid containing at least one of the naphthelenediazoic dyes shown by general formula (I) or (II):

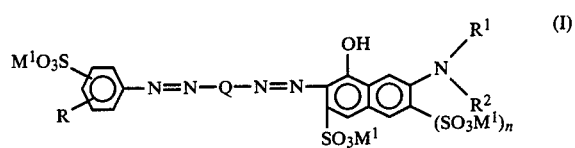

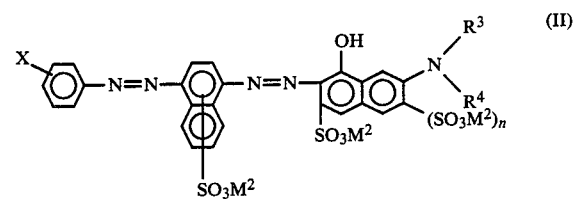

as defined in the claim, and a liquid medium for dissolving or dispersing the dye.

The recording liquid of this invention has the viscosity and surface tension in the proper ranges, does not cause clogging discharging orifices of an ink-jet recorder and shows good storage stability. Furthermore, the recording liquid gives recorded images excellent in fixing speed, light resistance, water resistance, abrasion resistance and resolution.

18 Claims, 5 Drawing Figures

RECORDING LIQUID

FIELD OF THE INVENTION

This invention relates to a recording liquid containing a black naphthalenedisazoic dye. More specifically, the invention relates to a novel recording liquid particularly suitable for use in a recording system wherein recording is performed by ejecting recording liquid droplets through fine spouts (discharging orifices) of a recording head.

BACKGROUND OF THE INVENTION

For recording on recording media such as papers, etc., by writing instruments (e.g., a fountain pen, a felt pen, etc.), there have hitherto been used inks, which are solutions of various dyes dissolved in water or organic solvents.

Also, a so-called ink-jet recording system wherein recording is performed by ejecting a recording liquid (droplets of a recording ink) in a recording head through discharging orifices by the vibration of piezo oscillators, the electrostatic attraction caused by the application of a high voltage, etc., and for the recording system, recording liquids obtained by dissolving various dyes in water or organic solvents are used.

Such a recording liquid is fundamentally composed of a recording agent (a dye or a pigment) and a liquid medium (water, an organic solvent or a mixture of them) for dissolving or dispersing the recording agent and, if necessary, various additives are added to the recording liquid.

For the ink-jet recording liquid, more restrict performance characteristics are requested than for a general writing ink for writing instruments such as a fountain pen, a felt pen, etc. Preferred conditions required for this kind of recording liquid are as follows:

(1) The recording liquid possesses liquid properties (viscosity, surface tension, electric conductivity, etc.) matching the discharging conditions (a driving voltage and a driving frequency of a piezo electric element, the form and material of orifices, the diameter of orifices, etc.), (2) The recording liquid can be stored for a long period of time and does not cause clogging of orifices at use.

(3) The recording liquid is quickly fixed onto recording media such as papers, films, etc., the outlines of the resulting ink dots are smooth, and blotting of the dotted ink is minimized.

(4) The printed or recorded image by the recording liquid has a clear color tone and a high density.

(5) The printed or recorded image by the recording liquid is excellent in water resistance and light resistance.

(6) The recording liquid does not attach or erode surrounding materials (the container for the recording liquid, connecting tubes for discharging orifices, sealants, etc.).

(7) The recording liquid has no unpleasant smell, toxicity, inflammability, etc.

However, it is very difficult to obtain the recording liquid which satisfies all the foregoing conditions at the same time.

Also, since the recording liquid which is used for such a recording purpose is fundamentally composed of a dye and a solvent for the dye, the characteristics of the recording liquid greatly depend upon the property specific to the dye. Accordingly, it is very important in the field of the art to select a dye so that the recording liquid containing the dye has the foregoing characteristics.

As this kind of recording liquid, there are known solutions or dispersions of various dyes or pigments in aqueous or nonaqueous solvents as disclosed, for example, in Japanese Patent Publication Nos. 8361/'75; U.S. Pat. No. 3,846,141; and No. 3,705,043; Japanese Patent Publication No. 13,127/'77; U.S. Pat. No. 3,870,528, etc., and as black dyes for use in these recording liquids, following dyes (a) to (d) are known.

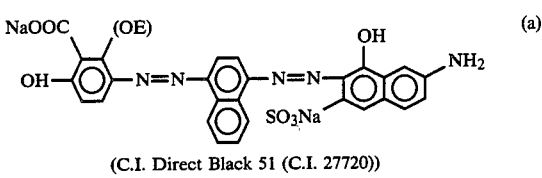

(C.I. Direct Black 51 (C.I. 27720))

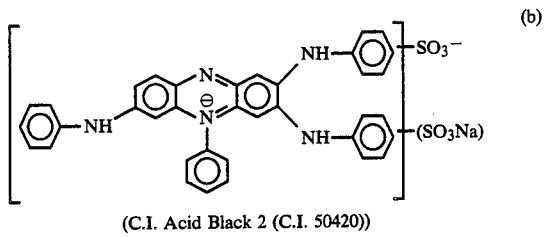

(C.I. Acid Black 2 (C.I. 50420))

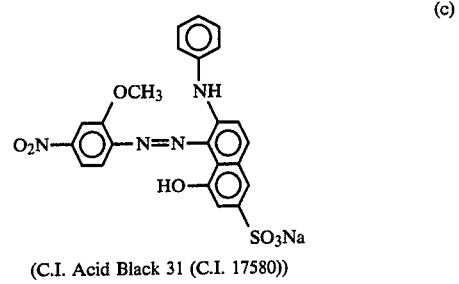

(C.I. Acid Black 31 (C.I. 17580))

A Cr complex salt of the compound (d) shown below.

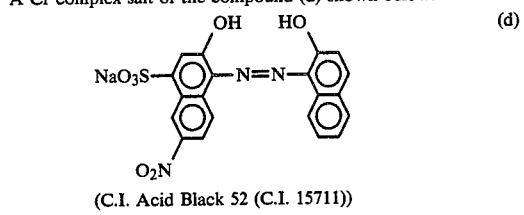

(C.I. Acid Black 52 (C.I. 15711))

Also, as black naphthalenedisazoic dyes, the dyes having following structural formulae are known.

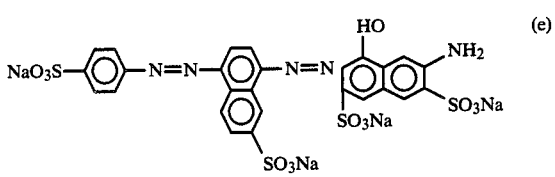

(C.I. Food Black 2 (C.I. 27755))

-continued

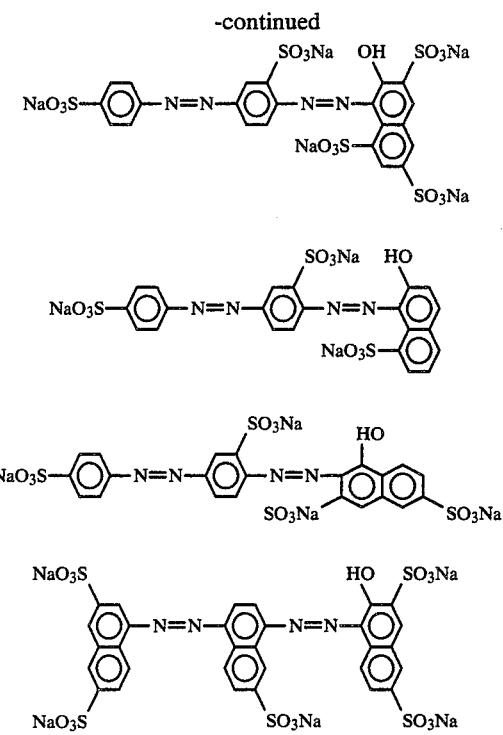

SUMMARY OF THE INVENTION

The object of this invention is to provide a recording liquid which satisfies foregoing conditions (1) to (7) at the same time.

That is, according to this invention, there is provided a recording liquid comprising at least one of naphthalenedisazoic dyes represented by general formula (I) or (II) as a recording agent and a liquid medium for dissolving or dispersing the recording medium;

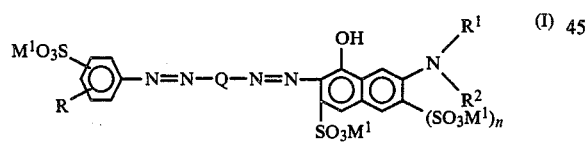

wherein Q represents a phenylene or naphthylene group substituted by a group shown by $-SO_3M^1$; R represents a hydrogen atom, a lower alkyl group, a lower alkoxy group, a lower acylamino group, a nitro group, or a halogen atom; $R^1$ represents a phenyl group substituted by a group shown by $-SO_3M^1$ or $-COOM^1$, a lower alkyl group substituted by a group shown by $-COOM^1$, or a lower alkylaminocarbonyl lower alkyl group; $R^2$ represents a hydrogen atom, a lower alkyl group substituted by a group shown by $-COOM^1$, or a lower alkylaminocarbonyl lower alkyl group; $M^1$ represents an alkali metal atom, an ammonium cation, or H.A (wherein A represents an amine); and n represents 0 or 1;

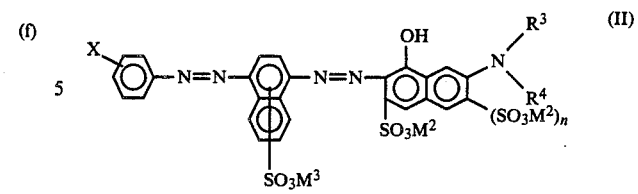

wherein X represents an alkylcarbonylamino group having 2 to 5 carbon atoms, an arylcarbonylamino group, an alkylsulfonylamino group having 1 to 4 carbon atoms, an arylsulfonylamino group, an unsubstituted carbonamido group or a carbonamido group substituted by an alkyl group having 1 to 4 carbon atoms, an unsubstituted sulfonamido group or a sulfonamido group substituted by an alkyl group having 1 to 4 carbon atoms, or a group shown by $-SO_3M^2$; $R^3$ represents a hydrogen atom, an alkyl group having 1 to 8 carbon atoms, an alkylcarbonyl group having 3 to 9 carbon atoms, an alkylsulfonyl group having 1 to 4 carbon atoms, an arylsulfonyl group, or a group shown by $-CH_2SO_3M^2$; $R^4$ represents a hydrogen atom or an alkyl group having 1 to 8 carbon atoms; when X represents $-SO_3M^2$ said $R^3$ and $R^4$ do not, however, represent a hydrogen atom at the same time; $M^2$ represents an alkali metal atom, an ammonium cation, or H.A (wherein A represents an amine); and n represents 0 or 1.

DESCRIPTION OF THE PREFERRED EMBODIMENT

Figure 1:
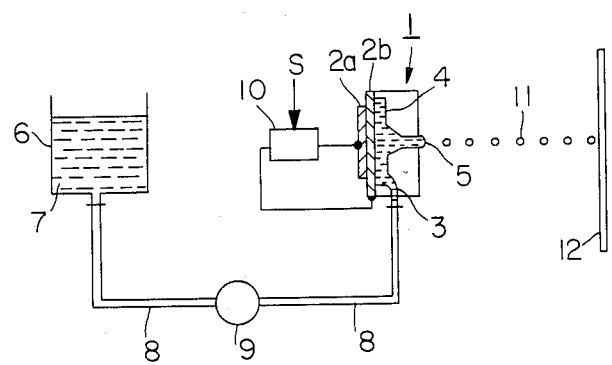
FIG. 1 and FIG. 2 are schematic views showing ink-jet recorders.

By the term "recording agent" in this invention is meant a component or components for forming recording images.

The lower alkyl group in above-described general formula (I) is, preferably, an alkyl group having 1 to 4 carbon atoms, such as, for example, a methyl group, an ethyl group, a propyl group, etc.

The lower alkoxy group in general formula (I) is, preferably, an alkoxy group having 1 to 4 carbon atoms, such as, for example, a methoxy group, an ethoxy group, etc.

The lower acylamino group in general formula (I) is, preferably, an acylamino group having 2 to 5 carbon atoms, such as, for example, an acetylamino group, a propionylamino group, etc.

Examples of the halogen atom in general formula (I) are a chlorine atom, a bromine atom, etc., examples of the alkali metal atom are lithium atom, sodium atom, potassium atom, etc.

The aryl group shown by X and $R^3$ in above-described general formula (II) is, preferably, an aryl group having 6 to 10 carbon atoms, such as, for example, a phenyl group, a p-toluyl group, etc.

Examples of the alkali metal atom shown by $M^2$ are lithium atom, sodium atom, potassium atom, etc., and examples of the amine shown by $M^2$ are triethanolamine, etc.

In the alkylcarbonylamino group, the alkyl moiety of which has 1 to 4 carbon atoms, shown by X in general formula (II), an acetylamino group and a propionylamino group are preferred and in the arylcarbonylamino group shown by X, a benzoylamino group is preferred. Furthermore, a group shown by $-SO_3M^2$ is preferred as X in general formula (II), $R^3$ in general formula (II) is, preferably, a hydrogen atom, an alkyl group having 1 to 8 carbon atoms, and alkylcarbonyl group having 3 to 9 carbon atoms, or a group shown by $-CH_2SO_3M^2$. $M^2$ in the above formulae is preferably an alkali metal.

Then, specific examples of the dyes shown by general formula (I) are shown in Table 1 together with the maximum absorption wave lenghts thereof in aqueous solutions.

TABLE 1

| Dye No. | Structural Formula of Dye | Maximum Absorption Wave Lengths [nm] |
|---|---|---|
| 1 | [structure with $NaO_3S$–phenyl–N=N–naphthyl($SO_3Na$)–N=N–naphthyl(HO, $SO_3Na$)–$NHC_2H_4COONa$] | 576 |
| 2 | [structure with $NaO_3S$–phenyl–N=N–naphthyl($SO_3Na$)–N=N–naphthyl(HO, $SO_3Na$)–NH–phenyl–$SO_3Na$] | 587 |
| 3 | [structure with $NaO_3S$–phenyl–N=N–naphthyl($SO_3Na$)–N=N–naphthyl(HO, $SO_3Na$)–$N(C_2H_4COONa)_2$] | 572 |
| 4 | [structure with $NaO_3S$–phenyl–N=N–naphthyl($SO_3Na$)–N=N–naphthyl(HO, $SO_3Na$)–$NHCH_2COONa$] | 569 |
| 5 | [structure with $NaO_3S$–phenyl–N=N–naphthyl($SO_3Na$)–N=N–naphthyl(HO, $SO_3Na$)–$NHC_3H_6COONa$] | 577 |

TABLE 1-continued

| Dye No. | Structural Formula of Dye | Maximum Absorption Wave Lengths [nm] |
|---|---|---|
| 6 | NaO$_3$S—⟨⟩—N=N—[naphthalene]—N=N—[naphthalene(HO, SO$_3$Na)]—NHC$_2$H$_4$CON(CH$_3$)$_2$ ; SO$_3$Na | 576 |
| 7 | NaO$_3$S—⟨⟩—N=N—[naphthalene]—N=N—[naphthalene(HO, SO$_3$Na)]—NHC$_2$H$_4$CONHC$_3$H$_7$ ; SO$_3$Na | 576 |
| 8 | NaO$_3$S—⟨⟩—N=N—[naphthalene]—N=N—[naphthalene(HO, SO$_3$Na)]—NH—⟨⟩—COONa ; SO$_3$Na | 588 |
| 9 | NaO$_3$S—⟨⟩—N=N—[naphthalene]—N=N—[naphthalene(HO, SO$_3$Na, SO$_3$Na)]—NHC$_2$H$_4$COONa ; SO$_3$Na | 596 |
| 10 | NaO$_3$S—⟨⟩—N=N—[naphthalene]—N=N—[naphthalene(HO, SO$_3$Na, SO$_3$Na)]—NHC$_2$H$_4$CON(CH$_3$)$_2$ ; SO$_3$Na | 597 |
| 11 | NaO$_3$S—⟨⟩—N=N—[naphthalene]—N=N—[naphthalene(HO, SO$_3$Na)]—N(C$_2$H$_4$CONHC$_3$H$_7$)$_2$ ; SO$_3$Na | 573 |

TABLE 1-continued

| Dye No. | Structural Formula of Dye | Maximum Absorption Wave Lengths [nm] |
|---|---|---|
| 12 | (structure: NaO$_3$S–C$_6$H$_4$–N=N–naphthalene(SO$_3$Na)–N=N–naphthalene(OH)(SO$_3$Na)–NH–C$_6$H$_4$–COONa) | 607 |
| 13 | (structure: NaO$_3$S–C$_6$H$_4$–N=N–naphthalene(SO$_3$Na)–N=N–naphthalene(OH)(SO$_3$Na)–NHC$_2$H$_4$COONa) | 575 |
| 14 | (structure: C$_6$H$_4$(SO$_3$Na)–N=N–naphthalene(NO$_3$Na)–N=N–naphthalene(OH)(NO$_3$Na)–NHCH$_2$COONa) | 569 |
| 15 | (structure: C$_6$H$_4$(SO$_3$Na)–N=N–naphthalene(SO$_3$Na)–N=N–naphthalene(OH)(SO$_3$Na)–NHC$_2$H$_4$COONa) | 577 |
| 16 | (structure: C$_6$H$_4$(SO$_3$Na)–N=N–naphthalene(SO$_3$Na)–N=N–naphthalene(OH)(SO$_3$Na)–NHC$_3$H$_6$COONa) | 570 |
| 17 | (structure: H$_3$C–C$_6$H$_3$(SO$_3$Na)–N=N–naphthalene(SO$_3$Na)–N=N–naphthalene(OH)(SO$_3$Na)–N(C$_2$H$_4$COONa)$_2$) | 573 |

TABLE 1-continued

| Dye No. | Structural Formula of Dye | Maximum Absorption Wave Lengths [nm] |
|---|---|---|
| 18 | H₃CO–C₆H₃(SO₃Na)–N=N–naphthalene(SO₃Na)–N=N–naphthalene(OH)(SO₃Na)–NHC₂H₄COONa | 576 |
| 19 | H₅C₂O–C₆H₃(SO₃Na)–N=N–naphthalene(SO₃Na)–N=N–naphthalene(OH)(SO₃Na)–NH–C₆H₄–SO₃Na | 588 |
| 20 | H₃COCHN–C₆H₃(SO₃Na)–N=N–naphthalene(SO₃Na)–N=N–naphthalene(OH)(SO₃Na)–NHC₂H₄CON(CH₃)₂ | 591 |
| 21 | O₂N–C₆H₃(SO₃Na)–N=N–C₆H₃(SO₃Na)–N=N–naphthalene(OH)(SO₃Na)–NHC₃H₆COONa | 573 |
| 22 | CH₃–C₆H₃(SO₃Na)–N=N–naphthalene(SO₃Na)–N=N–naphthalene(OH)(SO₃Na)(SO₃Na)–NHC₂H₄CON(CH₃)₂ | 596 |
| 23 | Cl–C₆H₃(SO₃Na)–N=N–C₆H₃(SO₃Na)–N=N–naphthalene(OH)(SO₃Na)–N(C₃H₆COONa)₂ | 574 |

TABLE 1-continued

| Dye No. | Structural Formula of Dye | Maximum Absorption Wave Lengths [nm] |
|---|---|---|
| 24 | 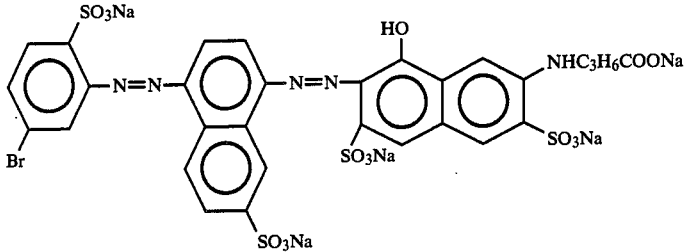 | 593 |

The dyes shown by general formula (I) for use in this invention can be prepared by the method shown below in accordance with the methods described, for example, in Yutaka Hosoda, *Riron Seizo Senryo Kagaku (Theoretical and Production Chemistry of Dyestuff)*, page 585, line 28 to page 586, line 15, published by Gihodo Co., July 15, 1968 and Yutaka Hosoda, *Shin Senryo Kagaku (New Dyestuff Chemistry)*, page 397, line 27 to page 398, line 19, published by Gihodo Co., Dec. 21, 1973.

That is, a monoazo compound represented by general formula (VI);

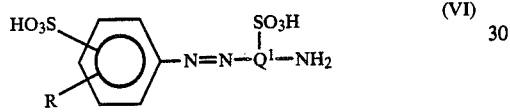

wherein R has the same meaning as defined above and $Q^1$ represents a phenylene group or a naphthylene group is obtained by diazotizing an amine represented by general formula (IV);

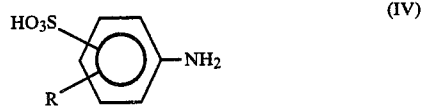

wherein R has the same meaning as defined above, in a mineral acid such as hydrochloric acid, sulfuric acid, etc., using sodium nitrite, etc., and coupling the diazotized product with an amine represented by general formula (V);

wherein $Q^1$ has the same meaning as defined above.

Then, the disazo compound is obtained by diazotizing the monoazo compound produced in the above method in a mineral acid such as hydrochloric acid, sulfuric acid, etc., using sodium nitrite, etc., and then coupling the diazotized product with a naphthol represented by general formula (VII);

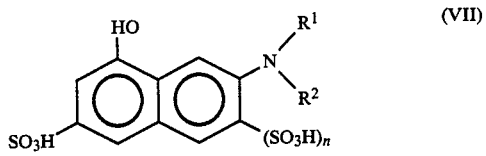

wherein $R^1$, $R^2$ and n have the same meaning as defined above.

When $M^1$ is an alkali metal atom (e.g., a lithium, sodium or potassium atom), the monoazo compound is subjected to the coupling reaction with the naphthol at a pH of 8 to 10 after the diazotization thereof, and in this case, lithium hydroxide, sodium hydroxide, or potassium hydroxide is added to the coupling reaction system for maintaining the pH, whereby $-SO_3H$ is converted into $-SO_3M^1$.

When $M^1$ is an ammonium cation or H.A (wherein A is an amine), the disazo compound having $-SO_3M^1$ (wherein $M^1$ is a lithium, sodium or potassium atom) prepared in the above method is brought into contact with an ion-exchange resin or treated with an acid to convert $-SO_3M^1$ to $-SO_3H$ and then the ammonium salt or the amine salt is formed.

Then, specific examples of general formula (II) are shown in Table 2 below together with the maximum absorption wave lengths thereof in aqueous solutions.

TABLE 2

| Dye No. | Structural Formula of Dye | Maximum Absorption Wave Length (nm) |
|---|---|---|
| 1 | 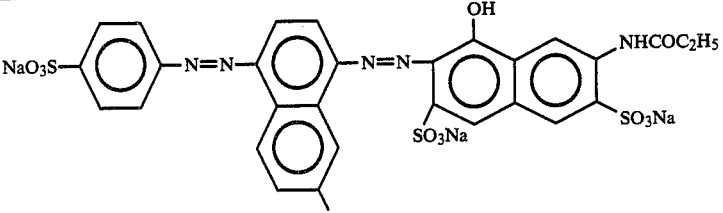 | 584 |

TABLE 2-continued

| Dye No. | Structural Formula of Dye | Maximum Absorption Wave Length (nm) |
|---|---|---|
| 2 | NaO$_3$S–⟨⟩–N=N–(naphthalene-SO$_3$Na)–N=N–(naphthalene with OH, SO$_3$Na, SO$_3$Na, NHSO$_2$–⟨⟩–CH$_3$) | 579 |
| 3 | NaO$_3$S–⟨⟩–N=N–(naphthalene-SO$_3$Na)–N=N–(naphthalene with OH, SO$_3$Na, SO$_3$Na, NHC$_4$H$_9$) | 592 |
| 4 | NaO$_3$S–⟨⟩–N=N–(naphthalene-SO$_3$Na)–N=N–(naphthalene with OH, SO$_3$Na, SO$_3$Na, N(CH$_3$)$_2$) | 594 |
| 5 | H$_3$COCHN–⟨⟩–N=N–(naphthalene-SO$_3$Na)–N=N–(naphthalene with OH, SO$_3$Na, SO$_3$Na, NH$_2$) | 590 |
| 6 | H$_3$COCHN–⟨⟩–N=N–(naphthalene-SO$_3$Na)–N=N–(naphthalene with OH, SO$_3$Na, NHCH$_2$SO$_3$Na) | 590 |
| 7 | H$_3$CO$_2$SHN–⟨⟩–N=N–(naphthalene-SO$_3$Na)–N=N–(naphthalene with OH, SO$_3$Na, SO$_3$Na, NH$_2$) | 588 |

TABLE 2-continued
| Dye No. | Structural Formula of Dye | Maximum Absorption Wave Length (nm) |
|---|---|---|
| 8 | 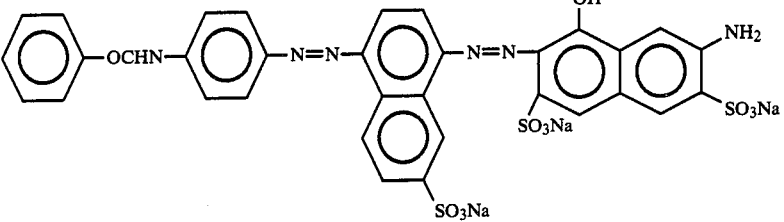 | 589 |
| 9 | 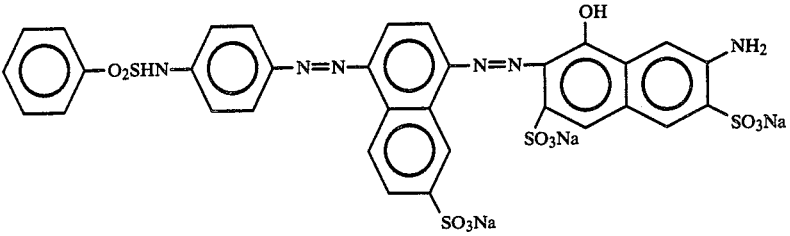 | 587 |
| 10 | 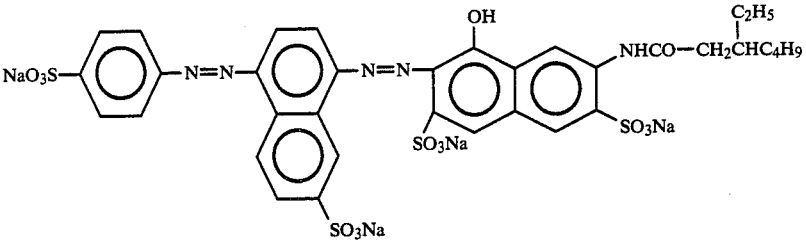 | 585 |
| 11 | 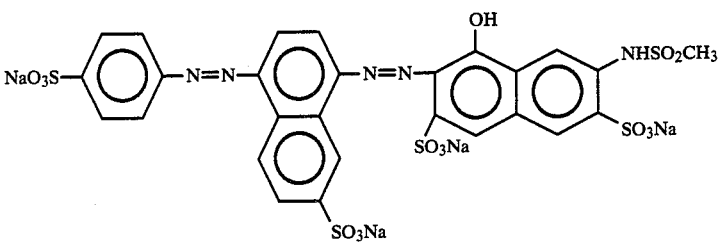 | 581 |
| 12 | 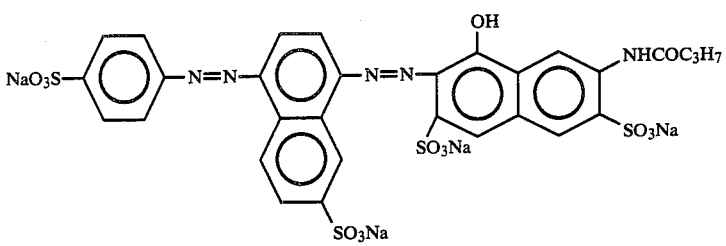 | 584 |
| 13 | 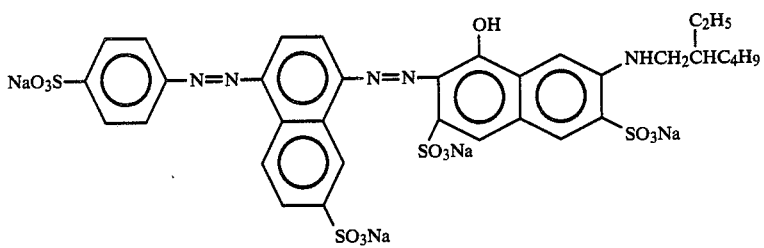 | 592 |

TABLE 2-continued

| Dye No. | Structural Formula of Dye | Maximum Absorption Wave Length (nm) |
|---|---|---|
| 14 | H₇C₃OCHN—⟨C₆H₄⟩—N=N—(naphthalene, SO₃Na)—N=N—(naphthol with OH, NH₂, 2× SO₃Na) | 590 |
| 15 | H₂NOC—⟨C₆H₄⟩—N=N—(naphthalene, SO₃Na)—N=N—(naphthol with OH, NH₂, 2× SO₃Na) | 596 |
| 16 | H₂NO₂S—⟨C₆H₄⟩—N=N—(naphthalene, SO₃Na)—N=N—(naphthol with OH, NH₂, 2× SO₃Na) | 595 |
| 17 | H₃CHNOC—⟨C₆H₄⟩—N=N—(naphthalene, SO₃Na)—N=N—(naphthol with OH, NH₂, 2× SO₃Na) | 595 |
| 18 | H₃CHNO₂S—⟨C₆H₄⟩—N=N—(naphthalene, SO₃Na)—N=N—(naphthol with OH, NH₂, 2× SO₃Na) | 594 |
| 19 | H₃COCHN—⟨C₆H₄⟩—N=N—(naphthalene, SO₃Na)—N=N—(naphthol with OH, NH₂, 2× SO₃Na) | 584 |

TABLE 2-continued

| Dye No. | Structural Formula of Dye | Maximum Absorption Wave Length (nm) |
|---|---|---|
| 20 | KO₃S–C₆H₄–N=N–(naphthalene with SO₃K, SO₃K)–N=N–(naphthalene with OH, NHCOC₂H₅, SO₃K) | 585 |
| 21 | LiO₃S–C₆H₄–N=N–(naphthalene with SO₃Li)–N=N–(naphthalene with OH, NHCOC₄H₉, SO₃Li, SO₃Li) | 584 |
| 22 | H₃COCHN–C₆H₄–N=N–(naphthalene with SO₃K)–N=N–(naphthalene with OH, NH₂, SO₃K, SO₃K) | 590 |
| 23 | H₃COCHN–C₆H₄–N=N–(naphthalene with SO₃NH₄)–N=N–(naphthalene with OH, NH₂, SO₃NH₄, SO₃NH₄) | 590 |
| 24 | H₂NOC–C₆H₄–N=N–(naphthalene with SO₃NH(C₂H₄OH)₃)–N=N–(naphthalene with OH, NH₂, SO₃NH(C₂H₄OH)₃, SO₃NH(C₂H₄OH)₃) | 596 |
| 25 | (C₆H₄ with SO₃Na)–N=N–(naphthalene with SO₃Na)–N=N–(naphthalene with OH, NHC₄H₉, SO₃Na, SO₃Na) | 593 |

TABLE 2-continued

| Dye No. | Structural Formula of Dye | Maximum Absorption Wave Length (nm) |
|---|---|---|
| 26 | 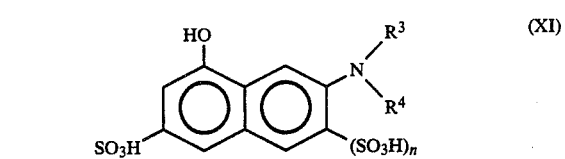 | 586 |

The dyes shown by general formula (II) for use in this invention can be prepared by the method shown below in accordance with the method described, for example, in Yutaka Hosoda, *Shin Senryo Kagaku* (*New Dyestuff Chemistry*), page 397, line 27 to page 398, line 19, published by Gihodo Co., Dec. 21, 1973.

That is, a monoazo compound represented by general formula (X);

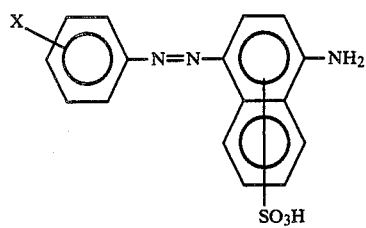 (X)

wherein X has the same meaning as defined above, is first prepared by diazotizing an amine represented by general formula (VIII);

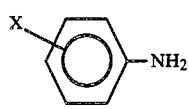 (VIII)

wherein X has the same meaning as defined above in a mineral acid such as hydrochloric acid, sulfuric acid, etc., using sodium nitrite and then coupling the diazotized product with an amine represented by general formula (IX);

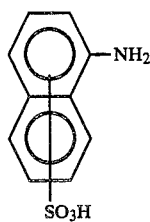 (IX)

Then, the disazo compound is easily obtained by diazotizing the monoazo compound prepared in the above step in a mineral acid such as hydrochloric acid, sulfuric acid, etc., using sodium nitrite, etc., and then coupling the diazotized product with a naphthol represented by general formula (XI);

$$\underset{SO_3H}{\overset{HO}{\text{(naphthol)}}}\underset{(SO_3H)_n}{\overset{R^3}{\underset{R^4}{N}}} \quad (XI)$$

wherein $R^3$, $R^4$ and n have the same meaning as defined above.

Furthermore, the disazo compound shown by general formula (XI) wherein —$SO_3H$ is converted into —$SO_3M^2$ can be obtained by the same manner as the case of obtaining the disazo compound of general formula (I).

The content of the dye in the recording liquid of this invention is determined according to the nature of the liquid medium component, the characteristics required for the recording liquid, etc., but is general in the range of 0.1 to 20% by weight, preferably 0.5 to 15% by weight, more preferably 1 to 10% by weight to the total weight of the recording liquid.

The dyes in this invention can be used solely or as a combination of two or more kinds of them, or further may be used as the indispensable component together with other dye or dyes such as a direct dye, an acid dye, etc. the amount of such conventional dyes which can be used together with the dye of this invention is usually 0 to 30% by weight of the dye for use in this invention.

As a liquid medium component for the recording liquid of this invention, water or a mixture of water and a water-soluble organic solvent or solvents is used. Examples of the water-soluble organic solvents which can be used for the recording liquids of this invention are alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc.; ketones or ketone alcohols such as acetone, diacetone alcohol, etc.; ethers such as tetra-hydrofuran, dioxane, etc.; nitrogen-containing heterocyclic ketones such as N-methyl-2-pyrrolidone, 1,3-dimethyl-2-imidazolidinone, etc.; polyalkylene glycols such as polyethylene glycol, polypropylene glycol, etc.; alkylene glycols the alkylene moiety of which has 2 to 6 carbon atoms, such as ethylene glycol, propylene glycol, butylene glycol, triethylene glycol, 1,2,6-hexantriol, thiodiglycol, hexylene glycol, diethylene glycol, etc.; glycerol; lower alkyl ethers (the alkyl moiety having usually 1 to 4 carbon atoms) of polyhydric alcohols such as ethylene glycol methyl ether, diethylene glycol methyl (or ethyl) ether, triethylene glycol monomethyl (or ethyl) ether, etc.

The content of the foregoing water-soluble organic solvent in the recording liquid is usually in the range of 5 to 89.9% by weight, preferably 10 to 80% by weight, more preferably 20 to 50% by weight to the total weight of the recording liquid.

In this case, the content of water is determined in a wide range according to the nature of the foregoing solvent component, the composition of the solvents, and the desired characteristics of the recording liquid but is usually in the range of 10 to 90% by weight, preferably 10 to 70% by weight, more preferably 20 to 70% by weight.

The recording liquid of this invention can be easily prepared by mixing the necessary components by an ordinary manner without need of any troublesome procedures.

The recording liquids of this invention have balanced excellency by themselves in recording characteristics (e.g., a recording response, a stability of droplet formation, a discharging stability, a long continuous recording property, a discharging stability after resting the recording for a long period of time, etc.), a storage stability, a fixing property onto recording media, and the light resistance, weather resistance, water resistance, etc., of recorded images but for further improving these properties, the recording liquids may contain various additives conventionally known in the field of the art.

Examples of these additives are viscosity controlling agents (for usually imparting a viscosity of 1 to 20 c.p. to the recording liquids), such as polyvinyl alcohol, delluloses, water-soluble resins, etc.; surface tension controlling agents (for preferably adjusting the surface tension of the recording liquids to 40 to 65 dynes/cm), such as various cationic, anionic or nonionic surface active agents, diethanolamine, triethanolamine, etc.; pH-controlling agents (for preferably adjusting the pH of the recording liquids to 4 to 10), such as buffers; and fungicides (such as sodium dehydroacetoacetate, 1,2-benzisothiazolin-3-one, 6-acetoxy-2,4-dimethylmetadioxane, etc.).

Also, for preparing the recording liquid of this invention which is used for an ink-jet recording system of a type that a recording liquid is charged with electricity, a specific resistance controlling agent such as an inorganic salt (e.g., lithium chloride, ammonium chloride, sodium chloride, etc.), etc., is added to the recording liquid.

Furthermore, when the recording liquid of this invention is applied to an ink-jet recording system of a type that a recording liquid is ejected by the action of heat energy, the thermal properties (e.g., the specific heat, the coefficient of thermal expansion, the heat conductivity, etc.) of the recording liquid is controlled by suitably selecting the kind of the solvent of the recording liquid, the component ratio of the recording liquid, etc.

The recording liquid of this invention possess the following merits. That is, the physical properties such as viscosity, surface tension, etc., thereof are in the proper ranges, the recording liquid does not clog fine discharging orifices of an ink-jet recorder, the recording liquid provides recorded images having high density, the recording liquid does not cause change in physical properties or deposition of solid components during the storage of the liquid, the recording liquid can record on various recording media without restriction of the kind of the recording media, and also the recording liquid is fixed quickly and gives recorded images excellent in water resistance, light resistance, abrasion resistance and resolution.

Then, an ink-jet recording system is explained hereinbelow.

There are various ink-jet recording systems according to the difference in the method of generating recording droplets and of controlling the flying direction of the droplets.

An example of the recording systems is shown in FIG. 1. That is, FIG. 1 is a schematic view showing an ink-jet recording system which performs recording by applying recording signals to the recording head having a piezo electric oscillator to generate droplets of recording liquid in response to the recording signals. As shown in FIG. 1, a recording head 1 is provided with a piezo electric oscillator 2a, a vibration plate 2b, an inlet 3 for a recording liquid, a liquid-holding chamber 4, and a discharging orifice 5. A recording liquid 7 stored in a storage tank 6 is introduced into the liquid chamber 4 through a feed pipe 8. In addition, as the case may be, an intermediate treating means 9 such as a pump, filter, etc., is equipped to the feed pipe 8. Pulsed signals converted from recording signals S by a signal-processing means 10 (e.g., a pulse convertor) are applied to the piezo electric oscillator 2a to vary the pressure of the recording liquid in the liquid chamber 4 in response to the pulsed signals, whereby the recording liquid 7 is ejected in the form of droplets 11 from the discharging orifice 5 to make a record on the surface of a recording medium 12.

Figure 2:
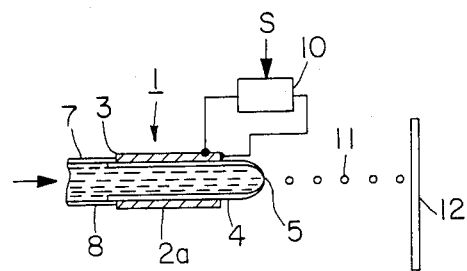

Besides the aforesaid ink-jet recording system, there are known various types of ink-jet recording systems. For example, FIG. 2 shows a modification in recording head 1 of the recording device shown in FIG. 1, in which a cylindrical piezo electric oscillator 2a is disposed around a nozzle-formed liquid-holding chamber 4. The mechanism of generating recording liquid droplets is fundamentally same as in the recording system shown in FIG. 1.

Moreover, there are known a ink-jet recording system in which electrically charged droplets are continuously generated and parts of the droplets are used for recording, and an ink-jet recording system in which thermal energy is applied to the recording liquid in the liquid chamber in a recording head in response to recording signals to generate droplets of the recording liquid by the thermal energy.

Figure 3A:
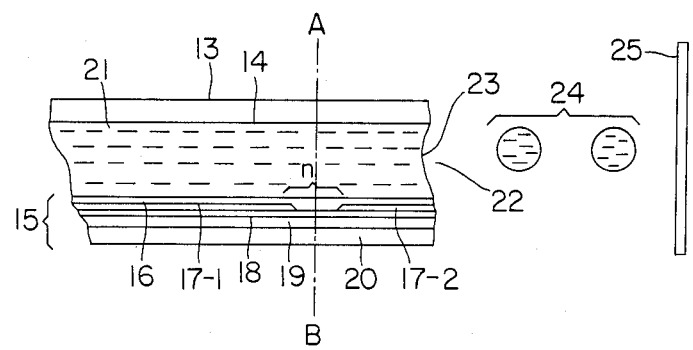
FIG. 3A is an enlarged sectional view of a head of an ink-jet recorder taken along the flowing passageway of ink.
Figure 3B:
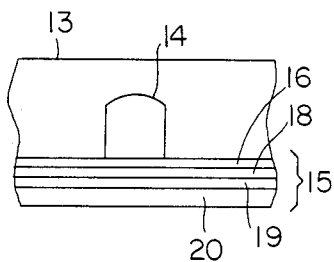
FIG. 3B is a cross sectional view taken along line A-B of the head shown by FIG. 3A.
Figure 4:
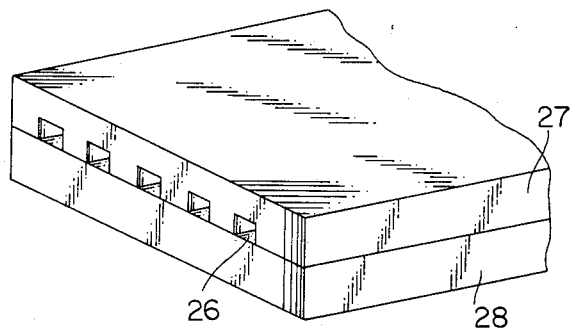
FIG. 4 is a perspective view of a multi-head which is an array of such heads as shown in FIGS. 3A and 3B.

An example of these recording systems is shown in FIG. 3A, FIG. 3B and FIG. 4.

A recording head 13 is composed of a glass, ceramic or plastic plate having an ink-passing channel 14 and a heating head 15, which is used for heat-sensitive recording, bonded to the plate. In addition, a thin film-type head is illustrated in FIG. 3A as the heating head 15 but the heating head for use in this invention is not restricted to the type. The heating head 15 is composed of a protective film 16 made of silicon oxide, etc., aluminum electrodes 17-1 and 17-2, a heating resistor layer 18 made of nichrome, etc., a heat accumulating layer 19, and a substrate 20 having a good heat radiating property, such as alumina, etc.

An ink 21 is filled in the channel 14 up to a discharging orifice 22 and forms a meniscus 23 by the action of pressure P.

Now, on applying electric signals onto the electrodes 17-1 and 17-2, the heating head 15 rapidly generates heat at the region shown by n to form bubbles in the ink 21 which is in contact with the region, the meniscus 23 of the ink is projected by the action of the pressure, and the ink 21 is ejected to a recording medium 25 from the discharging orifice 22 as recording droplets 24. FIG. 4 shows an external appearance of a multiple head composed of an array of a number of the recording heads shown in FIG. 3A. The multi-head is made by bonding a glass plate 27 having a number of channel 26 with a heating head similar to the one illustrated in FIG. 3A.

FIG. 3A is a cross sectional view of the recording head 13 taken along the passageway of ink and FIG. 3B is a cross sectional view taken along line A-B in FIG. 3A.

SYNTHESIS EXAMPLE 1

(Synthesis of Dye No. I-1)

(1) Preparation of 1st diazo liquid:

To 346 ml of a 3% aqueous hydrochloric acid solution was added 17.3 g of sulfanilic acid and the mixture was stirred for 3 hours to provide a uniform slurry. To the slurry was added an aqueous solution of 7.3 g of sodium nitrite dissolved in 73 ml of water. Then, after stirring the mixture for one hour at 3° C. to perform the diazotization, remaining sodium nitrite was eliminated by the addition of 3 g of sulfamic acid to provide a 1st diazo liquid.

(2) Preparation of 2nd diazo liquid:

To 450 ml of water was added 22.3 g of 1,7-Cleve's acid having the formula

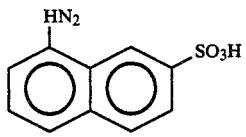

and the mixture was stirred for 2 hours to provide a uniform slurry. To the slurry were added 300 g of ice, the 1st diazo liquid obtained in foregoing step (1), and 10 ml of a 25% aqueous sodium hydroxide solution and then the resultant mixture was stirred for 15 hours at a pH of 2 to 3 to perform the coupling reaction. Thereafter, 200 g of sodium chloride was added to the coupling reaction product to perform salting out. The reaction product thus precipitated was collected by filtration, washed with 500 ml of a 10% aqueous sodium chloride solution and dried to provide 34.6 g of a monoazo compound having the formula:

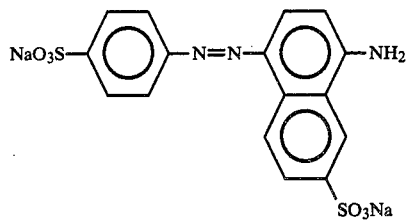

To 410 ml of a 5% aqueous hydrochloric acid solution was added 20.4 g of the monoazo compound thus obtained and after stirring the mixture for 5 hours to provide a uniform slurry, the slurry was cooled to 3° C. by the addition of 300 g of ice. An aqueous solution of 3.8 g of sodium nitrite dissolved in 38 ml of water was added to the slurry and after stirring the resultant mixture for 4 hours at 3° C. to perform the diazotization, remaining sodium nitrite was eliminated by the addition of 1 g of sulfamic acid to provide a 2nd diazo liquid.

(3) Coupling:

After adding 15.6 g of N-β-carboxyethyl γ-acid to 460 ml of water, the pH of the mixture was adjusted to 9 by adding thereto 20 ml of a 25% aqueous sodium hydroxide solution. Then, after adding thereto 600 g of ice to adjust the temperature to 3° C., the 2nd diazo liquid obtained in the above step (2), 200 g of ice, and 35 ml of a 25% aqueous sodium hydroxide solution were added alternatively to the mixture at a pH of 8 to 10 and a temperature of 2° to 5° C. to perform coupling.

After further stirring the reaction mixture for 5 hours at the same temperature and pH as above, 250 g of sodium chloride was added thereto to salt out a dye. The dye thus deposited was collected by filtration and washed with 300 ml of a 10% aqueous sodium chloride solution to provide 210 g of a wet cake. The wet cake was subjected to a desalting treatment and then dried to provide 28.6 g of the desired dye with a yield of 78.5%.

The result of the elemental analysis was as follows.

|  | C | H | N |
|---|---|---|---|
| Calculated: | 42.6% | 2.3% | 8.6% |
| Found | 42.5% | 2.1% | 8.8% |

SYNTHESIS EXAMPLE 2

(Synthesis of Dye No. I-2)

After adding 19.8 g of N-(metasulfo)phenyl-γ-acid to 600 ml of water, the pH thereof was adjusted to 9 by the addition of 20 ml of a 25% aqueous sodium hydroxide solution. After adding thereto 800 g of ice to adjust the temperature thereof to 3° C., and 2nd diazo liquid obtained in Synthesis Example 1-(2), 200 g of ice, and 35 ml of a 25% aqueous sodium hydroxide solution were alternatively added to the mixture at a pH of 8 to 10 and a temperature of 2° to 5° C. to perform coupling.

The reaction mixture was stirred for 5 hours at the same temperature and pH as above and then 300 g of sodium chloride was added thereto to salt out a dye. The dye thus deposited was collected by filtration and then washed with 300 ml of a 10% aqueous sodium chloride solution to provide 280 g of a wet cake. The wet cake was subjected to a desalting treatment and then dried to provide 36.1 g of the desired dye with a yield of 80.2%.

The result of the elemental analysis was as follows.

|  | C | H | N |
|---|---|---|---|
| Calculated: | 42.6% | 2.0% | 7.8% |
| Found: | 42.5% | 2.1% | 7.5% |

SYNTHESIS EXAMPLE 3

(Synthesis of Dye No. I-15)

By following the same procedure as in Synthesis Example 1 except that orthanilic acid was used in place of sulfanilic acid and 1-aminonaphthalene-2-sulfonic acid was used in place of 1,7-Cleve's acid, 28.9 g of Dye No. I-15 was obtained. The yield was 79.5%.

The result of the elemental analysis was as follows.

|  | C | H | N |
|---|---|---|---|
| Calculated: | 42.6% | 2.3% | 8.6% |
| Found: | 42.3% | 2.4% | 8.4% |

SYNTHESIS EXAMPLE 4

(Synthesis of Dye No. II-3)

After adding 18.8 g of 1-hydroxy-7-butylaminonaphthalene-3,6-disulfonic acid to 460 ml of water, 800 g of ice, the 2nd diazo liquid obtained in Synthesis Example 1-(2), and 55 ml of a 25% aqueous sodium hydroxide solution were added to the mixture to perform coupling at a pH of 8 to 10 and a temperature of 2° to 5° C.

The reaction mixture was stirred for 5 hours at the same temperature and pH as above and then 250 g of sodium chloride was added thereto to salt out a dye. The dye thus deposited was collected by filtration and washed with 300 ml of a 10% aqueous sodium chloride solution to provide 210 g of a wet cake. The wet cake thus formed was subjected to desalting treatment and then dried to provide 32.5 g of the desired dye with a yield of 78.5%.

The result of the elemental analysis was as follows.

|  | C | H | N |
|---|---|---|---|
| Calculated: | 43.4% | 2.8% | 8.4% |
| Found: | 43.1% | 3.0% | 8.7% |

SYNTHESIS EXAMPLE 5

(Synthesis of Dye No. II-5)

By following the same procedure as in Synthesis Example 1-(1) and (2) except that 15.0 g of 4-aminoacetanilide was used in place of 17.3 g of sulfanilic acid, a 2nd diazo liquid of the monoazo compound of the formula

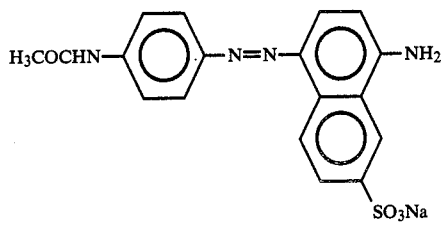

was obtained.

Then, by following the same procedure as in Synthesis Example 4 except that 16.0 g of 1-hydroxy-7-aminonaphthalene-3,6-disulfonic acid was used in place of 18.8 g of 1-hydroxy-7-butylamino-naphthalene-3,6-disulfonic acid and also the 2nd diazo liquid obtained above step was used as the 2nd diazo liquid, 32.5 g of the desired dye was obtained. The yield was 85.0%.

The result of the elemental analysis was as follows.

|  | C | H | N |
|---|---|---|---|
| Calculated: | 44.0% | 2.5% | 11.0% |
| Found: | 43.8% | 2.4% | 11.2% |

SYNTHESIS EXAMPLE 6

(Synthesis of Dye No. II-6)

By following the same procedure as in Synthesis Example 4 except that the 2nd diazo liquid obtained in Synthesis Example 5 was used as the 2nd diazo liquid and 16.7 g of 8-hydroxy-6-sulfonic acid-2-naphthylaminomethanesulfonic acid of the formula

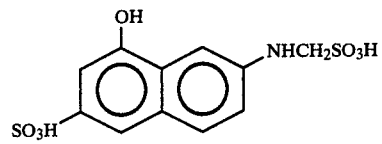

was used in place of 18.8 g of 1-hydroxy-7-butylaminonaphthalene-3,6-disulfonic acid, 28.6 g of the desired dye was obtained. The yield was 78.5%.

The result of the elemental analysis was as follows.

|  | C | H | N |
|---|---|---|---|
| Calculated: | 43.8% | 2.6% | 10.6% |
| Found: | 43.9% | 2.4% | 10.3% |

EXAMPLE 1

| Ion-exchanged water (hereinafter, is referred simply to as water) | 71 wt. parts |
|---|---|
| Diethylene glycol | 25 wt. parts |
| Dye No. I-1 | 4 wt. parts |
| Total | 100 wt. parts |

The foregoing components were sufficiently mixed in a vessel to dissolve the solid components and after filtering the mixture with a Teflon filter having micro pores of 1 micron of pore size under pressure, the filtrate was subjected to a degassing treatment using a vacuum pump to provide a recording liquid. The recording liquid thus obtained was subjected to following tests $T_1$ to $T_5$ using a recording device having on-demand type ink-jet recording heads for discharging droplets of a recording liquid by a piezo electric oscillator (the discharging orifice diameter of 50 microns, the piezo electric oscillator driving voltage of 60 volts, and the frequency of 4 KHz). The results were all satisfactory.

Test $T_1$: Long storage stability of recording liquid:

When the recording liquid was stored for 6 months at $-30°$ C. and 60° C. in a closed glass container, the deposition of insoluble matters was not observed and the properties and color tone of the liquid were unchanged.

Test $T_2$: Discharging stability:

When recording was performed by continuously ejecting the recording liquid for 24 hours in an atmosphere of room temperature, 5° C. and 40° C., high-quality recording could be stably performed throughout the test period under each condition.

Test $T_3$: Discharging response:

When the intermittent discharging of the recording liquid at two-second interval and the discharging after allowing to stand the recording liquid for 2 months were tested, no orifice top clogging occurred and stable and uniform recording was performed in each case.

Test $T_4$: Quality of recorded images:

The recorded images had high density and were clear. The density reduction percentage of the recorded images after exposing the images to a room lamp for 3 months was less than 1%. Also, when the recorded images were immersed in water for one minute, blotting of the images was very little.

Test $T_5$: Fixability for various kinds of recording media:

Recorded images formed on each of the recording papers shown in the following table were rubbed with a finger after 15 seconds since recording and the shift and blotting of the rubbed parts of the images were inspected. In each case, neither shift nor blotting of the images was observed, which showed the excellent fixability of the recording liquid.

| Tradename of paper | Paper grade | Maker |
|---|---|---|
| Ginkan | High quality paper | Sanyo Kokusaku Pulp Co., Ltd. |
| Seven Star | High quality paper | Hokuetsu Seishi K.K. |
| Haku Botan | Medium quality | Honshu Seishi K.K. |
| Toyo Filter Paper No. 4. | Non-sized paper | Toyo Roshi K.K. |

EXAMPLE 2

| | |
|---|---|
| Water | 62 wt. parts |
| N—methyl-2-pyrrolidone | 15 wt. parts |
| Diethylene glycol | 19 wt. parts |
| Dye No. I-2 | 4 wt. parts |
| Total | 100 wt. parts |

A recording liquid having the above components was prepared by the same manner as in Example 1 and subjected to Test $T_1$ to $T_5$ as in Example 1 using a recording device having an on-demand type multiple head (the discharging orifice diameter of 35 microns, the heating resistor resistance of 150Ω, the driving voltage of 30 volts, and frequency of 2 KHz) for recording by applying thermal energy to a recording liquid in the recording head to generate droplets of the recording liquid. The results are excellent in all the tests.

EXAMPLE 3

| | |
|---|---|
| Water | 45 wt. parts |
| Ethylene glycol | 20 wt. parts |
| 1,3-Dimethyl-2-imidazolidinone | 30 wt. parts |
| Dye No. I-9 | 5 wt. parts |
| Total | 100 wt. part |

A recording liquid having the above composition was prepared by the same manner as in Example 1 and subjected to Tests $T_1$ to $T_5$ as in Example 2. The results were excellent in all the tests.

EXAMPLE 4

| | |
|---|---|
| Water | 60 wt. parts |
| Diethylene glycol | 36 wt. parts |
| Dye No. I-13 | 4 wt. parts |
| Total | 100 wt. parts |

A recording liquid having the above components was prepared by the same manner as in Example 1 and subjected to Test $T_1$ to $T_5$ as in Example 2. The results were excellent in all the tests.

EXAMPLE 5

| | |
|---|---|
| Water | 66 wt. parts |
| Diethylene glycol monomethyl ether | 30 wt. parts |
| Dye No. I-17 | 4 wt. parts |
| Total | 100 wt. parts |

A recording liquid having the above components was prepared by the same manner as in Example 1 and subjected to Tests $T_1$ to $T_5$ as in Example 2. The results were excellent in all the tests.

EXAMPLE 6 TO 10

Recording liquids having the components shown in Table 3 below as Examples 6 to 10 were prepared by the same manner as in Example 1. Each of the recording liquids was filled in a felt pen and after writing on a medium quality paper (Haku Botan, trade name, made by Honshu Seishi K. K.) using each recording liquid, the water resistance of the written images was tested. Furthermore, the writing property of each recording liquid after allowing to stand the felt pen for 24 hours without the cap was tested.

The recording liquids in the examples were excellent in water resistance and writing property after allowing to stand. The results are shown in Table 3 below.

TABLE 3

| Example No. | Recording liquid component | wt. part |
|---|---|---|
| 6 | Water | 71 |
| | Diethylene glycol | 25 |
| | Dye No. I-17 | 4 |
| | Total | 100 |
| 7 | Water | 45 |
| | Ethylene glycol | 20 |
| | N—methyl-2-pyrrolidone | 30 |
| | Dye No. I-20 | 5 |
| | Total | 100 |
| 8 | Water | 60 |
| | Ethylene glycol monomethyl ether | 35 |
| | Dye No. I-22 | 5 |
| | Total | 100 |
| 9 | Water | 76 |
| | Diethylene glycol | 20 |
| | Dye No. I-24 | 4 |
| | Total | 100 |
| 10 | Water | 60 |
| | N—methyl-2-pyrrolidone | 15 |
| | Ethylene glycol dimethyl ether | 20 |
| | Dye No. I-3 | 5 |
| | Total | 100 |

The above-described results show the excellency of the recording liquids of this invention in water resistance and writing property thereof after allowing to stand for a long period of time.

In addition, when the same procedure as in Example 6 was followed using Dyes No. I-4, 5, 6, 7, 8, 10, 11, 12, 14, 15, 16, 18, 19, 21, 23 and 24 in place of Dye No.I-17, good results were obtained in each case.

EXAMPLE 11

| | |
|---|---|
| Diethylene glycol | 25 g |
| Dye No. II-1 | 4 g |
| Water | 71 ml |

| | |
|---|---|
| Total | 100 g |

By following the same procedure as in Example 1 using the above-described components, a recording liquid was prepared and the liquid was subjected to Tests $T_1$ to $T_5$ as in Example 1. The results of the tests were all excellent.

EXAMPLE 12

| | |
|---|---|
| N—methyl-2-pyrrolidone | 15 g |
| Diethylene glycol | 19 g |
| Dye No. II-2 | 4 g |
| Water | 62 ml |
| Total | 100 g |

By following the same procedure as in Example 1 using the above-described components, a recording liquid was prepared and the liquid was subjected to Tests $T_1$ to $T_5$ as in Example 1. The results of the tests were all excellent.

EXAMPLE 13

| | |
|---|---|
| Ethylene glycol | 20 g |
| 1,3-Dimethyl-2-imidazolidinone | 30 g |
| Dye No. II-9 | 5 g |
| Water | 45 ml |
| Total | 100 g |

By following the same procedure as in Example 1 using the above-described components, a recording liquid was prepared and the liquid was subjected to Tests $T_1$ to $T_5$ as in Example 1. The results of the tests were all excellent.

EXAMPLE 14

| | |
|---|---|
| Diethylene glycol | 36 g |
| Dye No. II-13 | 4 g |
| Water | 60 ml |
| Total | 100 g |

By following the same procedure as in Example 1 using the above-described components, a recording liquid was prepared and the recording liquid was subjected to Tests $T_1$ to $T_5$ as in Example 1. The results of the tests were all excellent.

EXAMPLE 15

| | |
|---|---|
| Diethylene glycol monomethyl ether | 30 g |
| Dye No. II-17 | 4 g |
| Water | 66 ml |
| Total | 100 g |

By following the same procedure as in Example 1 using the above-described components, a recording liquid was prepared and the recording liquid was subjected to Tests $T_1$ to $T_5$ as in Example 1. The results of the tests were all excellent.

EXAMPLES 16 TO 20

Recording liquids having the components shown in Table 4 below were prepared by the same manner as in Example 1. Each of the recording liquids was filled in a felt pen and the water resistance of recorded images written by each recording liquid on a medium quality paper (Haku Botan, trade name, made by Honshu Seishi K.K.) was inspected. Also, after allowing to stand each recording liquid for 24 hours without the cap of the felt pen, the writing property of the recording liquid was determined.

The results of the tests showed that the recording liquids of this invention were excellent in water resistance and writing property after storage.

TABLE 4

| Example No. | Recording liquid component | (g) |
|---|---|---|
| 16 | Diethylene glycol | 25 |
| | Dye No. II-17 | 4 |
| | Water | 71 |
| | Total | 100 |
| 17 | Ethylene glycol | 20 |
| | N—methyl-2-pyrrolidone | 30 |
| | Dye No. II-20 | 5 |
| | Water | 45 |
| | Total | 100 |
| 18 | Ethylene glycol monomethyl ether | 35 |
| | Dye No. II-22 | 5 |
| | Water | 60 |
| | Total | 100 |
| 19 | Diethylene glycol | 20 |
| | Dye No. II-24 | 4 |
| | Water | 76 |
| | Total | 100 |
| 20 | N—methyl-2-pyrrolidone | 15 |
| | Ethylene glycol dimethyl ether | 20 |
| | Dye No. II-3 | 5 |
| | Water | 60 |
| | Total | 100 |

In addition, when the same procedure as in Example 16 was followed using Dyes No. II-4, 5, 6, 7, 8, 10, 11, 12, 14, 15, 16, 18, 19, 21, 23, 25 and 26 in place of Dye No. II-17, good results were obtained in each case.

What is claimed is:

1. A recording liquid for ink jet recording or for writing comprising at least one of naphthalenedisazoic dyes represented by general formula (I) or (II) and a liquid medium for dissolving and dispersing the dye;

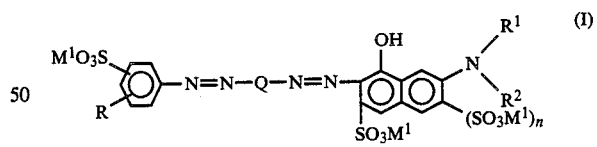

wherein Q represents a phenylene or naphthalene group substituted by a group shown by $-SO_3M^1$; R represents a hydrogen atom, a lower alkyl group, a lower alkoxy group, a lower acylamino group, a nitro group or a halogen atom; $R^1$ represents a phenyl group substituted by a group shown by $-SO_2M^1$ or a group shown by $-COOM^1$, a lower alkyl group substituted by a group shown by $-COOM^1$, or a lower alkylaminocarbonyl lower alkyl group; $R^2$ represents a hydrogen atom, a lower alkyl group substituted by a group shown by $-COOM^1$, or a lower alkylaminocarbonyl lower alkyl group; $M^1$ represents an alkali metal atom, an ammonium cation, or H.A. (wherein A represents an amine); and n represents 0 or 1;

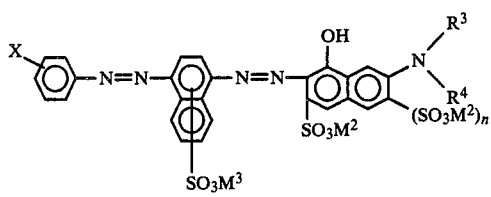

wherein X represents an alkylcarbonylamino group having 2 to 5 carbon atoms, an arylcarbonylamino group, an alkylsulfonylamino group having 1 to 4 carbon atoms, an arylsulfonylamino group, an unsubstituted carbonamido group or a carbonamido group substituted by an alkyl group having 1 to 4 carbon atoms, an unsubstituted sulfonamido group, a sulfonamido group substituted by an alkyl group having 1 to 4 carbon atoms, or a group shown by $-SO_3M^2$; $R^3$ represents a hydrogen atom, an alkyl group having 1 to 8 carbon atoms, or a group shown by $-CH_2SO_3M^2$; $R^4$ represents a hydrogen atom or an alkyl group having 1 to 8 carbon atoms; said $R^3$ and $R^4$ do not represent, however, a hydrogen atom at the same time when X is a group shown by $-SO_3M^2$; $M^2$ represents an alkali metal atom an ammonium cation, or H.A. (wherein A represents an amine); and n represents 0 or 1.

2. The recording liquid as claimed in claim 1, wherein the lower alkyl group is an alkyl group having 1 to 4 carbon atoms.

3. The recording liquid as claimed in claim 1, wherein the lower alkoxy group is an alkoxy group having 1 to 4 carbon atoms.

4. The recording liquid as claimed in claim 1, wherein the lower acylamino group is an acylamino group having 2 to 5 carbon atoms.

5. The recording liquid as claimed in claim 1, wherein the halogen atom is a chlorine atom or a bromine atom.

6. The recording liquid as claimed in claim 1, wherein the alkali metal atom is a lithium atom, a sodium atom or a potassium atom.

7. The recording liquid as claimed in claim 1, wherein the amine shown by A of H.A in general formulae (I) and (II) is triethanolamine.

8. The recording liquid as claimed in claim 1, wherein the aryl group shown by X in the general formula (II) is an aryl group having 6 to 10 carbon atoms.

9. The recording liquid as claimed in claim 1, wherein the aryl group shown by $R^3$ in general formula (II) is an aryl group having 6 to 10 carbon atoms.

10. The recording liquid as claimed in claim 1, wherein in the dye represented by general formula (I), Q is a naphthylene group substituted by a group shown by $-SO_3M^1$; R is a hydrogen atom, a methyl group, a methoxy group, or an acetylamino group; $R^1$ is a phenyl group substituted by a group shown by $-SO_3M^1$; $R^2$ is a hydrogen atom; $M^1$ is a sodium atom or a lithium atom; and n is 0.

11. The recording liquid as claimed in claim 1, wherein in the dye represented by general formula (I), Q is a naphthylene group represented by a group shown by $-SO_3M^1$; R is a hydrogen atom; $R^1$ is a phenyl group substituted by a group shown by $-SO_3M^1$; $R^2$ is a hydrogen atom; $M^1$ is a sodium atom, or a lithium atom; and n is 0.

12. The recording liquid as claimed in claim 1, wherein in the dye represented by general formula (II), X is an alkylcarbonylamino group having 2 to 5 carbon atoms $R^3$ is a hydrogen atom or a group shown by $-CH_2SO_3M^2$; $R^4$ is a hydrogen atom; $M^2$ is a sodium atom or a lithium atom; and n is 0 or 1.

13. The recording liquid as claimed in claim 1, wherein in the dye represented by general formula (II), X is an acetylamino group; $R^3$ is a group shown by $-CH_2SO_3M^2$; $R^4$ is a hydrogen atom; $M^2$ is a sodium atom or a lithium atom; and n is 0.

14. The recording liquid as claimed in claim 1, wherein said liquid is water or a mixture of water and a water-soluble solvent.

15. The recording liquid as claimed in claim 1, wherein the liquid medium is a mixture of water and a water-soluble organic solvent.

16. The recording liquid as claimed in claim 1, wherein the content of the dye is 0.1 to 20% by weight to the total weight of the recording liquid.

17. The recording liquid as claimed in claim 15, wherein the content of the water-soluble organic solvent is 5 to 89.9% by weight to the total weight of the recording liquid.

18. The recording liquid as claimed in claim 14, wherein the liquid medium is a mixture of water and a water-soluble organic solvent and the content of water is 10 to 90%, by weight to the total weight of the recording liquid.

* * * * *

UNITED STATES PATENT AND TRADEMARK OFFICE
CERTIFICATE OF CORRECTION

PATENT NO. : 4,626,284  Page 1 of 2
DATED : December 2, 1986
INVENTOR(S) : TOKUYA OHTA, ET AL.

It is certified that error appears in the above-identified patent and that said Letters Patent is hereby corrected as shown below:

On the Title Page:

AT [57] IN THE ABSTRACT

Line 1-2, "naph-/thelenediazoic" should read --naphthalenedisazoic--.

COLUMN 1

Line 56, "attach or" should read --attack nor--.

COLUMN 4

Line 8   "$SO_3M^3$" should read --$SO_3M^2$--.

COLUMN 25

Line 32, "delluloses," should read --celluloses--.

COLUMN 28

Line 4,  "carboxyethyl $\gamma$-acid" should read --carboxyethyl-$\gamma$-acid--.

COLUMN 29

Line 11-12, "butylaminonaph-/thalene" should read --butylamino-naphthalene--.

COLUMN 34

Line 66, "H.A." should read --H.A--.

UNITED STATES PATENT AND TRADEMARK OFFICE
CERTIFICATE OF CORRECTION

PATENT NO. : 4,626,284

DATED : December 2, 1986

INVENTOR(S) : TOKUYA OHTA, ET AL.

It is certified that error appears in the above-identified patent and that said Letters Patent is hereby corrected as shown below:

COLUMN 35

Line 8, "$SO_3M^3$" should read --$SO_3M^2$--.
Line 26, "atom an" should read --atom, an--.
Line 26, "H.A." should read --H.A--.

COLUMN 36

Line 22, "atoms $R^3$" should read --atoms; $R^3$--.

Signed and Sealed this

Twenty-fourth Day of March, 1987

*Attest:*

DONALD J. QUIGG

*Attesting Officer*     *Commissioner of Patents and Trademarks*